(12) United States Patent
Obrecht

(10) Patent No.: US 9,394,881 B2
(45) Date of Patent: Jul. 19, 2016

(54) WIND TURBINE BLADE AND METHOD OF FABRICATING A WIND TURBINE BLADE

(71) Applicant: John M. Obrecht, Louisville, CO (US)

(72) Inventor: John M. Obrecht, Louisville, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 530 days.

(21) Appl. No.: 13/904,414

(22) Filed: May 29, 2013

(65) Prior Publication Data

US 2014/0356182 A1 Dec. 4, 2014

(51) Int. Cl.
| | |
|---|---|
| *F03D 1/06* | (2006.01) |
| *B29C 70/34* | (2006.01) |
| *B21D 53/78* | (2006.01) |
| *B23P 15/04* | (2006.01) |
| *F01D 5/18* | (2006.01) |
| *B29D 99/00* | (2010.01) |
| *B23P 15/02* | (2006.01) |
| *B29L 31/08* | (2006.01) |

(52) U.S. Cl.
CPC .............. *F03D 1/0675* (2013.01); *B21D 53/78* (2013.01); *B23P 15/02* (2013.01); *B23P 15/04* (2013.01); *B29C 70/342* (2013.01); *B29D 99/0028* (2013.01); *F01D 5/18* (2013.01); *B29L 2031/085* (2013.01); *F05B 2240/302* (2013.01); *Y02E 10/721* (2013.01); *Y02E 10/722* (2013.01); *Y02P 70/523* (2015.11); *Y10T 29/49337* (2015.01); *Y10T 29/49339* (2015.01)

(58) Field of Classification Search
CPC ... F03D 1/0608; F03D 1/0633; F03D 1/0641; F03D 1/065; F03D 1/0658; F03D 1/0675; F03D 1/0683; F05B 2240/302; Y10T 29/49337; Y10T 29/49339; B21D 53/78; B23P 15/04; B29D 99/0025; B29D 99/0028; B29L 2031/085
See application file for complete search history.

(56) References Cited

U.S. PATENT DOCUMENTS

| | | | | |
|---|---|---|---|---|
| 4,709,714 | A * | 12/1987 | Nishino | B29C 53/066 134/108 |
| 7,521,105 | B2 * | 4/2009 | Bech | B29C 66/1162 416/229 R |
| 7,901,188 | B2 * | 3/2011 | Llorente Gonzalez | F03D 1/0675 416/223 R |
| 7,922,454 | B1 | 4/2011 | Riddell | |
| 8,348,622 | B2 * | 1/2013 | Bech | B29C 66/20 416/223 R |
| 2006/0083907 | A1 | 4/2006 | Bech et al. | |
| 2009/0155084 | A1 | 6/2009 | Livingston et al. | |
| 2010/0304170 | A1 * | 12/2010 | Frederiksen | B29C 65/42 428/542.8 |
| 2010/0314028 | A1 * | 12/2010 | Hedges | B29C 70/083 156/93 |
| 2011/0052403 | A1 | 3/2011 | Kawasetsu et al. | |
| 2013/0315747 | A1 * | 11/2013 | Schibsbye | F03D 1/0675 416/230 |
| 2014/0356182 | A1 * | 12/2014 | Obrecht | B21D 53/78 416/229 R |

FOREIGN PATENT DOCUMENTS

| | | | | | |
|---|---|---|---|---|---|
| DK | WO 2015003713 | A1 * | 1/2015 | | F03D 1/065 |
| EP | 0865900 | A1 | 9/1998 | | |
| EP | 2033769 | A1 | 3/2009 | | |

* cited by examiner

*Primary Examiner* — Igor Kershteyn
*Assistant Examiner* — Christopher R Legendre

(57) ABSTRACT

A wind turbine blade (162) and a method of forming a wind turbine blade. The method includes: forming an inner segment (10) of an airfoil, leaving a portion (16) of an inner weave (12) extending from the inner segment; forming an outer segment (18) of the airfoil, leaving a portion (24) of an outer weave (20) extending from the outer segment; overlapping the extending portion of the inner weave with the extending portion of the outer weave; infusing the overlapped extending portions with additional resin; and curing the additional resin to form a monolithic airfoil (160).

19 Claims, 4 Drawing Sheets

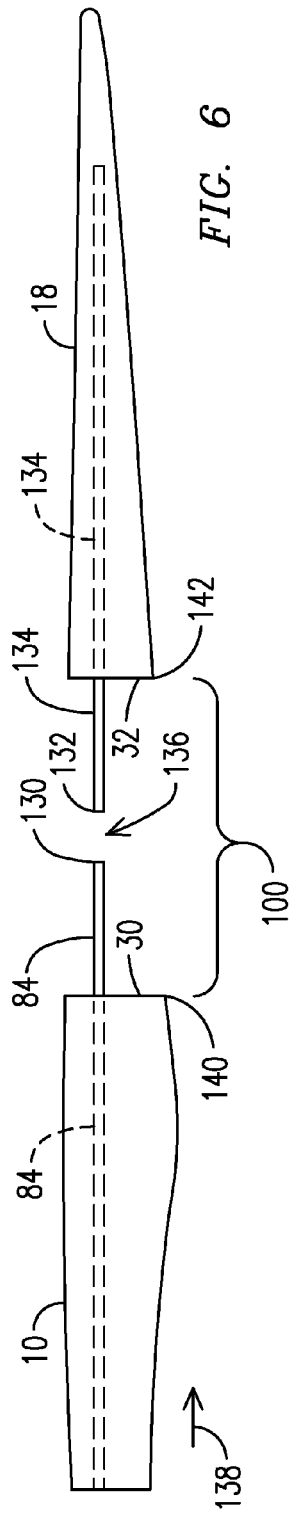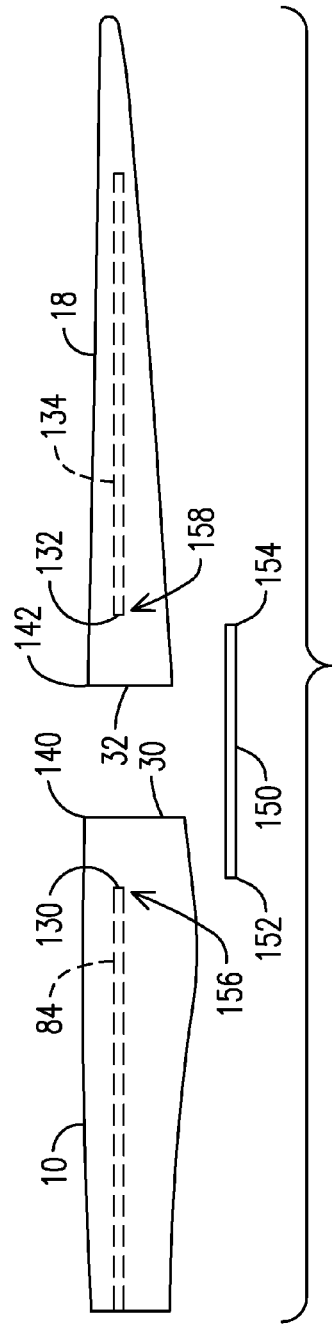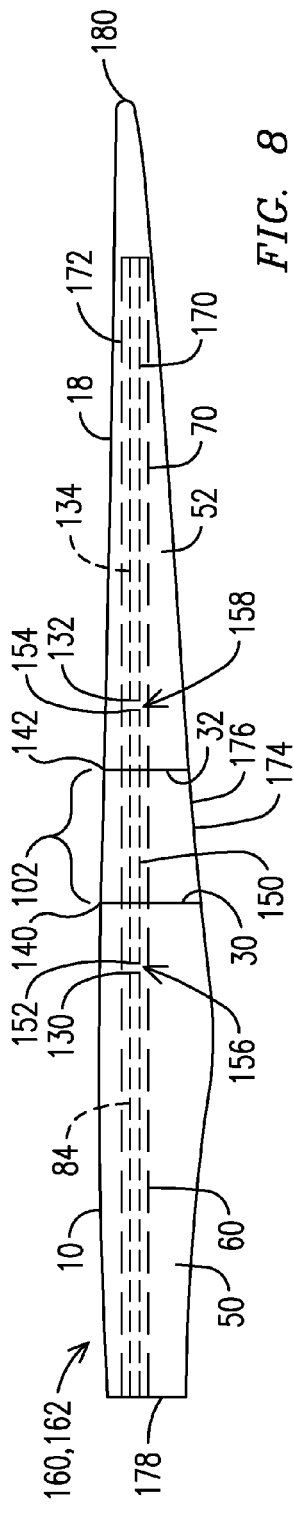

WIND TURBINE BLADE AND METHOD OF FABRICATING A WIND TURBINE BLADE

FIELD OF THE INVENTION

The invention relates to a wind turbine blade and a method of joining previously molded segments to form the wind turbine blade.

BACKGROUND OF THE INVENTION

Wind turbines rely on wind turbine blades to extract energy from the wind to generate electrical power. In the current state of the art larger blades on the order of 50 meters or more are being used in order to extract more energy. These blades are often manufactured at a facility and transported to a wind farm for final assembly into a wind turbine. The size, and in particular, the length of the blades poses logistical problems during the transportation step due to limitations of the infrastructure, including roadways, bridges, and in particular railway etc.

Industry has proposed various solutions to alleviate the transportation problems, including fabricating the blades in multiple pieces. These pieces may be assembled together at the wind farm to form the blade, usually by joining rigid components using fasteners such as bolts and optionally applying an adhesive. However, the blades formed using these methods still include bolted joints and these bolted joints may not endure as well as a cast blade would. Consequently there remains room in the art for improved methods for assembling of wind turbine blades.

BRIEF DESCRIPTION OF THE DRAWINGS

The invention is explained in the following description in view of the drawings that show:

FIG. 6 is a side view of the inner segment and its inner segment web member and the outer segment and its outer segment web member.

FIG. 7 is a side view of the inner segment an alternate embodiment of its inner segment web member, the outer segment and an alternate embodiment of its outer segment web member, and a joint web member.

FIG. 8 is a side view of an assembled blade using the joint web member of FIG. 7.

DETAILED DESCRIPTION OF THE INVENTION

The present inventor has devised a method of fabricating a wind turbine blade that allows assembly of previously-formed components. This method permits segments of a wind turbine blade to be formed in a location or locations remote from a final assembly site where the segments are joined to form the blade. Length related transportation problems associated with wind turbine blades of 50 meters or more in length are thereby reduced or eliminated. In particular, there will be an inner weave where a portion of the inner weave has been infused with cured resin and a portion that has not been infused with resin. The infused portion defines part of the blade and forms the inner segment. The un-infused portion will extend from the inner segment. Likewise, there will be an outer weave where a portion of the outer weave has been infused with cured resin and a portion that has not been infused with resin. The infused portion defines part of the blade and forms the outer segment. The un-infused portion will extend from the outer segment. The segments and respective un-infused portions may then be transported to a site where the wind turbine will be assembled and used, such as a wind turbine farm. Once on site, the segments will be carefully aligned in a mold, the un-infused portion of the inner and outer weaves will be positioned and infused with additional epoxy resin, and the epoxy resin will be cured, thereby joining the inner segment to the outer segment and forming the blade.

Figure 1:
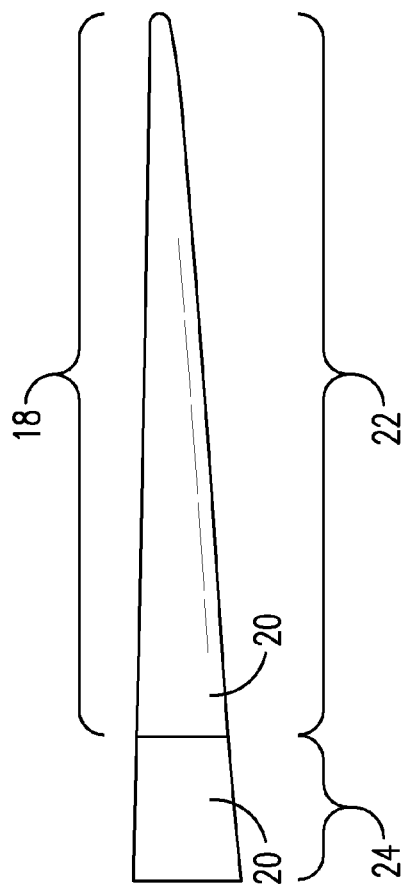
FIG. 1 is a side view of the inner segment and its inner weave and the outer segment and its outer weave.
Figure 1:
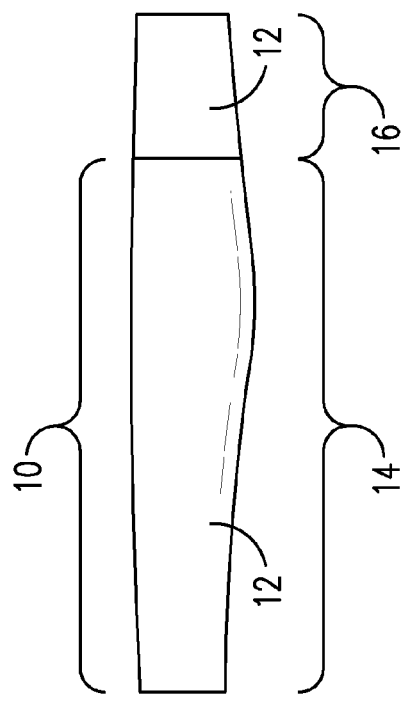

FIG. 1 shows an inner segment 10, an inner weave 12 having an infused portion 14 present in the inner segment 10 and an un-infused portion 16 extending from the inner segment 10, an outer segment 18, and an outer weave 20 having an infused portion 22 present in the outer segment 18 and an un-infused portion 24 extending from the outer segment 18. In this view the un-infused portions are extending straight from the respective segment. The un-infused portions may be folded and/or tucked inside the respective segments to protect them during transport etc. An outer profile of the segments themselves may be in a final shape such that when assembled the segments will require no further shaping. The weaves may be one or more layers of fiberglass mesh known to those in the art of wind turbine blade manufacture. Similarly, the epoxy resin may be of the type known to those in the art.

Figure 2:
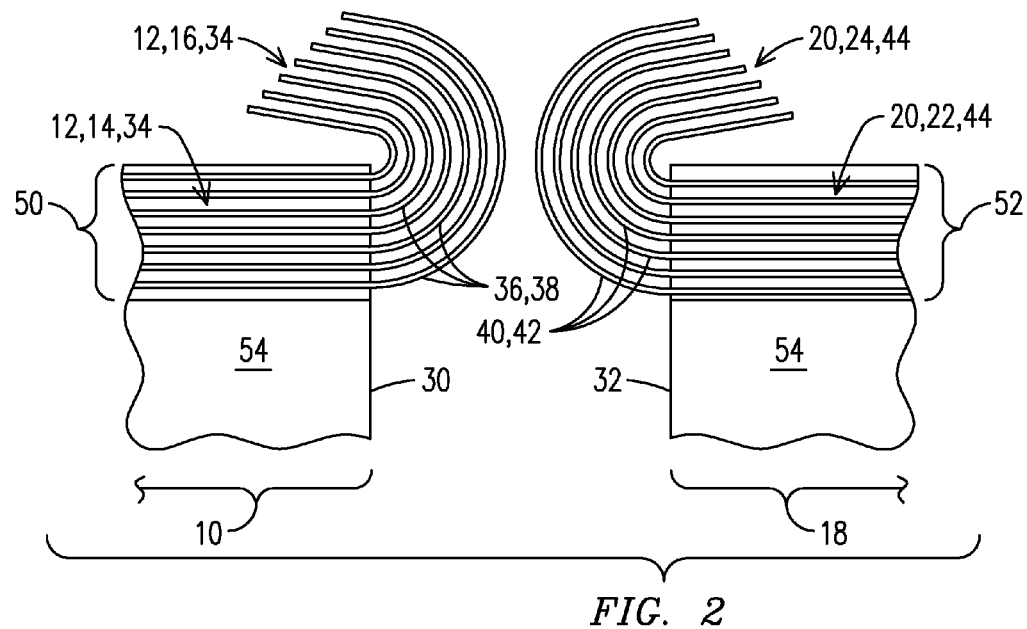
FIG. 2 is a partial cross section of the inner segment of FIG. 1.

FIG. 2 is a partial cross section of a joint end 30 of the inner segment 10 and a joint end 32 of the outer segment 18. The inner weave 12 may include any or all of an inner skin weave 34, inner spar cap weave(s) (not shown), and inner web weave(s) (not shown). Likewise, the outer weave 20 may include any or all of an outer skin weave 44, outer spar cap weave(s) (not shown) and outer web weave(s) (not shown). Thus, exemplary embodiments include those where skin weaves are joined as disclosed herein, spar cap weaves are joined as disclosed herein, web weaves are joined as disclosed herein, or any combination of skin weaves, spar cap weaves, and web weaves are joined. In exemplary embodiments where, for example, spar cap weaves are not joined as disclosed herein, the spar caps may either not be present or may be formed another way. Likewise, in exemplary embodiments where web weaves are not joined as disclosed herein, the web may either not be present or may be formed another way. Consequently, any wind turbine blade having at least one of a skin, a spar cap, or a web formed in the manner disclosed herein is considered to be within the scope of the disclosure, without regard for how a remainder of the blade is formed.

An un-infused portion 36 of layers 38 of the inner skin weave 34 has been pulled back over the inner segment 10 in preparation for weaving together an un-infused portion 40 of layers 42 of an outer skin weave 44 of the outer weave 20. The inner skin weave 34 of the inner segment 10 is disposed within a skin 50 of the inner segment 10 which ultimately forms part of a skin of an airfoil portion of the blade. Likewise, the outer skin weave 44 of the outer segment 18 is disposed within a skin 52 of the outer segment 18. The skins define a hollow interior 54 of the airfoil in which the spar caps and web (not shown here) are disposed.

The segments 10, 18 may be formed in any number of ways which are effective to form a defined shape yet permit the weaves 12, 20 to extend from the joint ends 30. For example, in an exemplary embodiment where vacuum infusion is used to distribute resin, a seal may be formed at the joint ends 30, 32 effective to form a vacuum and prevent any wicking of the resin. One method of forming the necessary seal includes interleaving wet-layup layers with the layers 38, 42 to form the seal, infusing the resin, and removing the wet-layup layers. Another method includes interleaving sealable, rubber-like layers with the layers 38, 42, forming the seal, infusing the resin, and then removing the rubber-like layers. Still another method includes interleaving layers of material that are watertight, yet which can be dissolved in a solution (other than epoxy), with the layers 38, 42, forming the seal, infusing the epoxy, and then dissolving the watertight, dissolvable layers.

Figure 3:
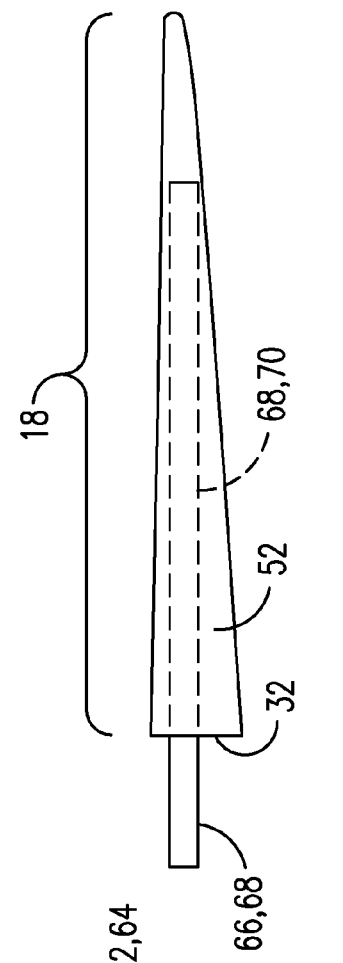
FIG. 3 is a side view of the inner segment and a spar portion of its inner weave and the outer segment and a spar portion of its outer weave.
Figure 3:
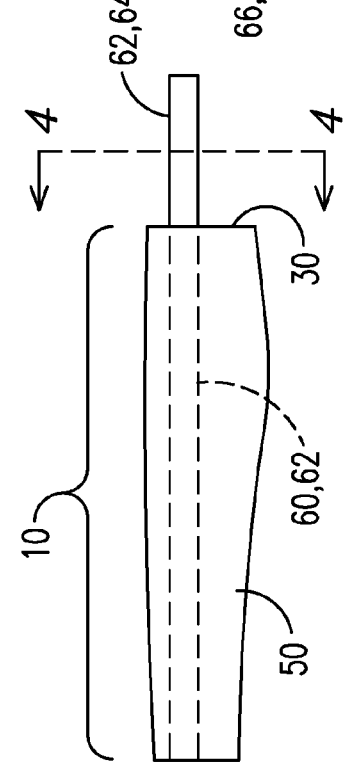

A typical airfoil design will include the airfoil skin, a pressure side spar cap, a suction side spar cap, and a web separating the pressure side spar cap from the suction side spar cap. However, since each of these segments disclosed herein only forms part of the airfoil, each has its own portion of the skin, spar caps, and web. FIG. 3 is a side view of the inner segment 10 where the inner skin weave 34 portion of the inner weave 12 has been removed to show and inner spar cap weave 62. An un-infused portion 64 of the inner spar cap weave 62 extends from the joint end 30 of the inner segment 10 to be joined with an un-infused portion 66 of an outer spar cap weave 68, which is part of the outer weave 20 and which extends from the joint end 32 of the outer segment 18. (The outer skin weave 44 of the outer segment is not shown to reveal the outer spar cap weave 68 and the outer spar cap 70.)

Figure 4:
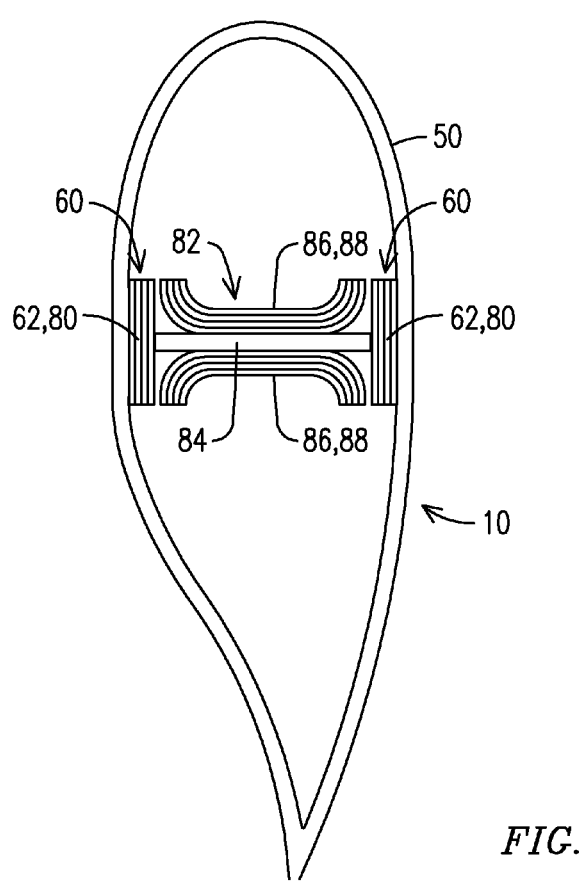
FIG. 4 is an end view of the inner segment of FIG. 2.

FIG. 4 is an end view of the inner segment 10 taken along line 4-4 in FIG. 3. Visible are the inner spar caps 60, the inner spar cap weaves 62, and layers 80 of the inner spar cap weaves 62. Also visible are an inner web 82 separating the inner spar caps 60. The inner web 82 is formed by an inner web member 84 and inner web weaves 86 each having multiple layers 88. Similar to the inner spar cap weaves 62, the inner web weaves 86 have an un-infused portion extending from the joint end 30 of the inner segment 10. The outer segment 18 likewise includes outer spar cap weaves, layers of the outer spar cap weaves, an outer web, an outer web member, an outer web weave, and layers of the outer web weave configured to match up with the respective components in the inner segment 10. Thus, while the exemplary embodiment shown in FIG. 4 has an arrangement where a web member separates spar caps in a configuration resembling an I-beam, various other exemplary arrangements are known to those in the art and may be used within the scope of the disclosure. For example, instead of an I-beam shape, the arrangement may have two web members set apart by some distance, or the arrangement may have a box (square or rectangular) shape etc. In addition, there may be a trailing edge arrangement, where the trailing edge may be configured like a spar cap or spar caps separated by a web member, and the shape may be that known to those in the art. Associated weaves would be overlapped in a manner similar to that described above.

Figure 5:
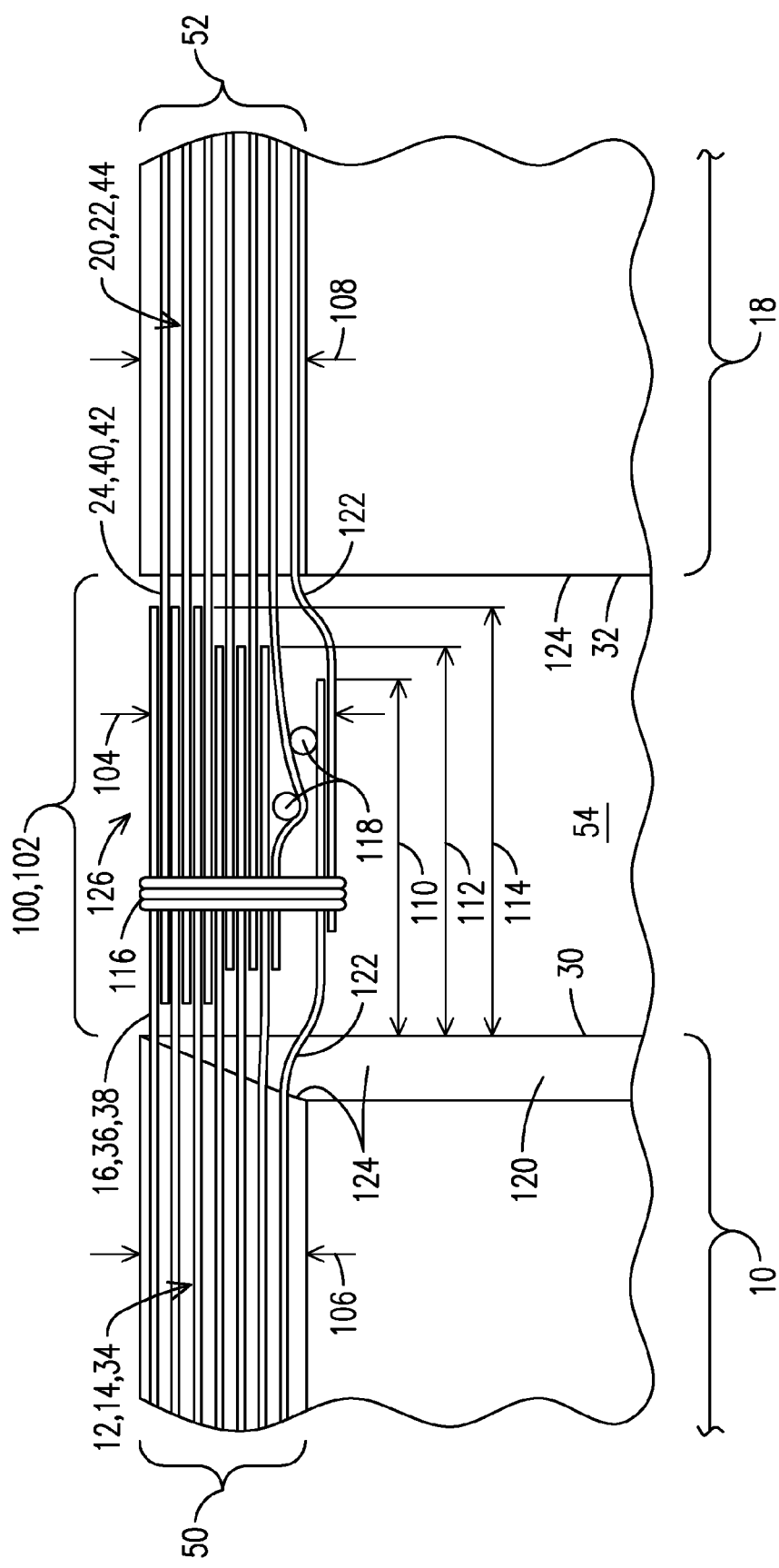
FIG. 5 is a partial cross section showing layers of a skin portion of the inner segment interleaved with layers of a skin portion of the outer segment.

FIG. 5 shows the arrangement of FIG. 2 but where the un-infused portion 36 of the layers 38 of the inner skin weave 34 have been interleaved with the un-infused portion 40 of the layers 42 of the outer skin weave 44 in a gap 100 between the joint end 30 of the inner segment 10 and the joint end 32 of the outer segment 18. Once filled with additional epoxy resin, the weave and the additional epoxy resin between the joint end 30 of the inner segment 10 and the joint end 32 of the outer segment 18 become a joint segment 102 of the airfoil. The layers 38, 42 may be interleaved in any pattern deemed suitable. For example, the inner skin weave layers 38 may be interleaved with the outer skin weave layers 42 so they alternate one by one. Alternately, they may be interleaved two by two, or one by two etc.

Due to the greater number of layers present in the joint segment 102, a thickness 104 of the skin in the joint segment 102 may be greater than a thickness 106 of the skin 50 of the inner segment 10 and a thickness 108 of the skin 52 of the outer segment 18. This change in thickness may manifest inwardly toward the hollow interior 54 in order to leave an external contour of the airfoil unaltered from its ideal aerodynamic shape. In addition, a distance 110, 112, 114 that individual layers 38 of the inner skin weave 34 may extend from the joint end 30 of the inner segment 10 may vary in order to enable a smoother transition between the thickness 104 of the skin in the joint segment 102 and the thickness 106 of the skin 50 of the inner segment 10 and the thickness 108 of the skin 52 of the outer segment 18. Likewise, the distances of the individual layers 42 of an outer skin weave 44 may terminate at different distances from the joint end 32 of the outer segment 18. Optional stitching 116 through the layers 38 of the inner skin weave 34 and the layers 42 of the outer skin weave 44 may be used to secure the layers in place. Optional strips 118 or other similar devices may be installed to form a tortuous path for the layers, thereby increasing a pull strength of the interleaved layers.

Unlike in a conventional airfoil where all of the resin throughout the airfoil is injected and cures in one operation, the additional resin is placed and cured in position between the already-cured resin of the inner segment 10 and the already-cured resin of the outer segment 18. To aid bonding and an associated strength of the additional epoxy of the joint segment 102 to the other segments, the joint end 30 of the inner segment 10 and/or the joint end 32 of the outer segment 18 may have a taper 120. This will increase a surface area for contact with the additional resin that is subsequently injected into the gap 100, and hence the associated bond strength. In addition, the taper 120 may decrease an amount of bending 122 in the layers resulting from the interleaving by increasing a distance from an end face 124 of a respective joint end 30, 32 to the interleaving 126. To further aid the bond strength the ends 30, 32 may be heated to below their melting temperature during the injection of resin into the gap 100. Once injected and cured, the additional resin of the joint segment 102 bonds with the resin of the inner segment 10 and the outer segment 18 to form a continuous body of resin, thereby forming a monolithic airfoil. Hence, the resulting airfoil shares the monolithic qualities of the conventionally infused and cured airfoils, but has interfaces where the additional resin meets the cured resin of the inner segment infused portion 14 and the cured resin of the outer segment infused portion 22.

The additional resin may be infused into the interleaved layers by any method known to those in the industry. In an exemplary embodiment a mold may be to align the segments and hold the interleaved layers in place and the additional resin may be infused via a vacuum infusion process. It is believed that when interleaved and resin infused as detailed above, a strength of the resulting joint segment 102 will be at least that of other joints in the industry, if not more, and may require less material than the other joints.

The skin weaves 34, 44 may have a same number of layers 38, 42 throughout the segments 10, 18. Alternately, the number of layers 38, 42 may vary along a span-wise (base to tip) length of the segments 10, 18. For example, the number of layers 38, 42 may increase toward the respective joint ends 30, 32 in order to meet a strength requirement of the joint segment 102.

If present, the un-infused portion 64 of the inner spar cap weave 62 and the un-infused portion 66 of outer spar cap weave 68 may be interleaved in a manner similar to the interleaving of the un-infused portion 36 of the inner skin weave 34 and the un-infused portion 40 of the outer skin weave 44 described above. Likewise, if present, the un-infused portion of the inner web weaves 86 and the un-infused portion of the outer web weaves may be similarly interleaved. However, in the instance where the web includes a web member such as, for example, balsa wood, it may be advantageous if the web member is in place before the interleaving occurs.

In an exemplary embodiment shown in FIG. 6, where an abutting end 130 the inner web member 84 and an abutting end 132 of the outer web member 134 abut each other, interleaving may occur as soon as the segments are positioned. In an exemplary embodiment a location 136 where the ends 130, 132 abut each other is staggered in a radial direction 138 (i.e. in a direction of a radial axis of the airfoil from a base to a tip of the airfoil) with respect to the airfoil from a location 140 of the joint end 30 of the inner segment 10 and from a location 142 of the joint end 32 of the outer segment 18. When the joint segment 102 is subsequently formed in the gap 100 the locations 136, 140, 142 will be radially staggered from each other and this will contribute to a continuity and associated strength of the airfoil.

In an exemplary embodiment shown in FIG. 7 a joint web member 150 is disposed between the inner web member and the outer web member, the joint web member may first be positioned before interleaving occurs. In this exemplary embodiment the abutting end 130 of the inner web member 84 is disposed within the inner segment 10. Likewise, the abutting end 132 of the outer web member 134 is disposed within the outer segment 18. The joint web member 150 may be positioned such that a first end 152 abuts the abutting end 130 of the inner web member 84 and a second end 154 abuts the abutting end 132 of the outer web member 134. An interior surface of the skin of each segment may include a slot to accommodate the joint web member 150 and/or hold it in place. Here again, a location 156 where the first end 152 abuts the inner web member 84 and a location 158 where the second end 154 abuts the outer web member 134 are staggered radially from the location 140 of the joint end 30 of the inner segment 10 and from the location 142 of the joint end 32 of the outer segment 18. This increases a continuity of the airfoil, thereby increasing a strength of the airfoil. Optionally, adhesive may also be used to secure abutting ends of any web member. Likewise, abutting ends may be tapered or have any other geometry considered advantageous for facilitating a strong bond.

FIG. 8 shows the airfoil 160 of the wind turbine blade 162 after the joint segment 102 has been formed between the inner segment 10 and the outer segment 18. In this exemplary embodiment a joint web member 150 has been installed between the inner web member 84 and the outer web member 134 to form a continuous web member 170. The inner spar cap 60 and the outer spar cap 70 have been joined to form a continuous spar cap 172. Likewise, the skin 50 of the inner segment 10, a skin 174 of the joint segment 102, and the skin 52 of the outer segment 18 have been joined to form a continuous skin 176 of the airfoil 160. It can be seen that the locations 156, 158 are radially staggered from ends 30, 32 of the segments 10, 18 in an effort to avoid having radially aligned locations of interfaces between segments or components of segments. The result is an airfoil 160 of a continuous, monolithic construction from a base end 178 to a tip end 180.

As disclosed herein, the airfoil 160 has been formed of an inner segment 10 that includes the base end 178 and an outer segment 18 that includes the tip 180. However, it is envisioned and considered within the scope of the disclosure that the airfoil 160 may include more than one joint segment 102. Specifically, there may be two or more joint segments, meaning there may be three or more other total segments. In these embodiments, the terms inner and outer are relative with respect to the joint segment being referenced. For example, for each joint segment there will be an inner segment that is closer to the base end 178 of the blade and an outer segment that is closer to the tip 180. In one airfoil there could be a first and second joint segment. The first joint segment may be closer to the base end 178 and may separate a first and second segment, which would be the inner and outer segments respectively with respect to the first joint. The second joint may separate the second and the third segment which would respectively be the inner and outer segments with respect to the second joint. In this exemplary embodiment the weave of the second segment would extend from both an inner end of the second segment (into the first joint) and an outer end of the second segment (into the second joint). Hence, there may be plural joint segments and each joint segment may join a relatively inner segment to a relatively outer segment.

From the foregoing it can be seen that the inventor has devised a solution for the increasing problems associated with transporting wind turbine blades above approximately 50 meters long. The solution removes a blade length limitation, and this frees designers to increase blade length. This increased blade length may result in greater operating efficiency of the wind turbines using the longer blades and may result also in lower installation costs for wind farm owners. Consequently, this solution will enable more efficient electrical generation as well. For at least these reasons the wind turbine blade and method disclosed herein represent an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of forming a wind turbine blade, the method comprising:
    forming an inner segment of an airfoil, leaving a portion of an inner skin weave and a portion of an inner spar cap weave extending from the inner segment;
    forming an outer segment of the airfoil, leaving a portion of an outer skin weave and a portion of an outer spar cap weave extending from the outer segment;
    overlapping the extending portion of the inner skin weave with the extending portion of the outer skin weave;
    overlapping the extending portion of the inner spar cap weave with the extending portion of the outer spar cap weave;
    infusing the overlapped extending portions of the skin weaves and the spar cap weaves with resin in a single operation; and
    curing the resin to form a monolithic airfoil.

2. The method of claim 1, further comprising interleaving layers of the inner skin weave with layers of the outer skin weave.

3. The method of claim 1, further comprising forming a joint between an inner segment web member and an outer segment web member so ends of the inner segment web member and the outer segment web member are staggered from ends of the inner segment and ends of the outer segment along a radial axis of the monolithic airfoil.

4. The method of claim 1, wherein the extending portion of the outer skin weave extends from a first end of the outer segment, and an additional portion of the outer skin weave extends from a second end of the outer segment, the method further comprising:
forming a third segment of the airfoil, leaving a portion of a third skin weave extending from the third segment;
overlapping the extending portion of the third skin weave with the extending additional portion of the outer skin weave; and
infusing the overlapped extending portion of the third skin weave and extending additional portion of the outer skin weave with resin.

5. A method of forming a wind turbine blade, the method comprising:
forming an airfoil inner segment comprising cured inner segment resin infused around an inner skin weave and around an inner web weave, wherein an un-infused portion of the inner skin weave and an un-infused portion of the inner web weave extend from the cured inner segment resin;
forming an airfoil outer segment comprising cured outer segment resin infused around an outer skin weave and around an outer web weave, wherein an un-infused portion of the outer skin weave and an un-infused portion of the outer web weave extend from the cured outer segment resin;
overlapping the un-infused portion of the inner skin weave and the un-infused portion of the outer skin weave with each other;
overlapping the un-infused portion of the inner web weave and the un-infused portion of the outer web weave with each other;
infusing the overlapped un-infused portions of the inner skin weave and outer skin weave and the un-infused portions of the inner web weave and the outer web weave with additional resin in a single operation to form a joint segment; and
curing the additional resin.

6. The method of claim 5, further comprising abutting ends of the inner web weave and the outer web weave at a location staggered from ends of the cured inner segment resin and the cured outer segment resin with respect to a radial axis of the wind turbine blade.

7. The method of claim 5, further comprising:
disposing a joint web member between the inner web weave and the outer web weave; and
abutting ends of the inner web weave and the outer web weave with respective ends of the joint web member at locations staggered from ends of the cured inner segment resin and the cured outer segment resin with respect to a radial axis of the wind turbine blade.

8. A wind turbine blade formed by the method of claim 5.

9. A wind turbine blade, comprising:
an airfoil inner segment comprising an inner skin weave and an inner spar cap weave infused in an inner segment resin;
an airfoil outer segment comprising an outer skin weave and an outer spar cap weave infused in an outer segment resin; and
an airfoil joint segment securing the inner segment to the outer segment, wherein the inner skin weave and the inner spar cap weave extend into the joint segment and terminate before reaching the outer segment, and wherein the outer skin weave and the outer spar cap weave extend into the joint segment and terminate before reaching the inner segment, and the inner and outer skin weaves and the inner and outer spar cap weaves are infused with a joint segment resin cured in an operation that is different from an operation where the inner and outer segment resins were cured;
wherein an increased thickness of a skin of the blade in the joint segment with respect to a thickness of the inner segment or a thickness of the outer segment manifests only into an interior of the blade.

10. The wind turbine blade of claim 9, wherein the joint segment further comprises a joint segment skin, and wherein the inner skin weave overlaps the outer skin weave in the joint segment skin.

11. The wind turbine blade of claim 9, wherein the joint segment further comprises a joint segment spar cap, and wherein the inner spar cap weave overlaps the outer spar cap weave in the joint segment spar cap.

12. The wind turbine blade of claim 9, wherein a plurality of layers of the inner skin weave are interleaved with a plurality of layers of the outer skin weave.

13. The wind turbine blade of claim 12, further comprising stitching through the interleaved layers or strips disposed between the interleaved layers effective to increase a pull strength of the interleaved layers.

14. The wind turbine blade of claim 13, wherein ends of the plurality of layers of at least one of the inner skin weave and the outer skin weave are staggered with respect to each other from a base to a tip of the blade.

15. The wind turbine blade of claim 9, wherein the inner segment further comprises a inner segment web member, wherein the outer segment further comprises a outer segment web member, and wherein abutting ends of the inner segment web member and the outer segment web member abut at a location staggered from ends of the inner segment and ends of the outer segment.

16. The wind turbine blade of claim 9, wherein the inner segment further comprises a inner segment web member, wherein the outer segment further comprises a outer segment web member, and wherein the joint segment further comprises a joint web member between the inner segment web member and the outer segment web member.

17. The wind turbine blade of claim 16, wherein the inner segment web member and the joint web member abut inside the inner segment, and wherein the outer segment web member and the joint web member abut inside the outer segment.

18. A wind turbine blade, comprising:
an airfoil inner segment comprising an inner skin weave and an inner spar cap weave infused in an inner segment resin;
an airfoil outer segment comprising an outer skin weave and an outer spar cap weave infused in an outer segment resin; and
an airfoil joint segment securing the inner segment to the outer segment, wherein the inner skin weave and the inner spar cap weave extend into the joint segment and terminate before reaching the outer segment, and wherein the outer skin weave and the outer spar cap weave extend into the joint segment and terminate before reaching the inner segment, and the inner and outer skin weaves and the inner and outer spar cap weaves are infused with a joint segment resin cured in an operation that is different from an operation where the inner and outer segment resins were cured;
wherein at least one of the inner segment resin and the outer segment resin comprises a tapered end from which a respective weave extends, wherein the tapered end forms a gap between the inner segment resin and the outer segment resin that is larger toward an interior of the blade.

19. A wind turbine blade, comprising:

an airfoil inner segment comprising an inner skin weave and an inner spar cap weave infused in an inner segment resin;

an airfoil outer segment comprising an outer skin weave and an outer spar cap weave infused in an outer segment resin; and an airfoil joint segment securing the inner segment to the outer segment, wherein the inner skin weave and the inner spar cap weave extend into the joint segment and terminate before reaching the outer segment, and wherein the outer skin weave and the outer spar cap weave extend into the joint segment and terminate before reaching the inner segment, and the inner and outer skin weaves and the inner and outer spar cap weaves are infused with a joint segment resin cured in an operation that is different from an operation where the inner and outer segment resins were cured;

wherein the joint segment further comprises strips disposed in the airfoil joint segment around which at least one weave bends.

* * * * *